United States Patent
Kramer

Patent Number: 5,110,383
Date of Patent: May 5, 1992

[54] METHOD OF SLEEPING BAG CONSTRUCTION AND ARTICLES MADE THEREBY

[75] Inventor: Paul F. Kramer, Berkeley, Calif.
[73] Assignee: Sierra Design, Inc., Berkeley, Calif.
[21] Appl. No.: 431,442
[22] Filed: Nov. 3, 1989
[51] Int. Cl.⁵ .............................................. D60C 25/00
[52] U.S. Cl. ...................... 156/88; 156/173; 156/175; 156/191; 156/193; 156/251; 2/69.5; 5/413
[58] Field of Search ................. 156/173, 174, 88, 191, 156/193, 251; 2/69.5, 272; 5/413; 242/68, 74; 57/11, 15; 28/124

[56] References Cited

U.S. PATENT DOCUMENTS 4,910,055 3/1990 Wigutow ........................... 2/69.5 X
4,921,557 5/1990 Nakamura ....................... 156/191 X

FOREIGN PATENT DOCUMENTS 1291570 10/1972 United Kingdom ............... 156/174

Primary Examiner—Michael W. Ball
Assistant Examiner—Nancy T. Krawczyk
Attorney, Agent, or Firm—Michael J. Hughes

[57] ABSTRACT

A method of manufacturing sleeping bags (10) and similar insulated articles is provided using continuous fiber materials. The articles constructed are in the nature of enclosing shells (23) containing a fibrous insulation material (28). The primary articles are sleeping bags (10). The process involves creation of a three dimensional last element (32) in the general volumetric shape of the article and then wrapping the continuous fiber material (28) about the last (32) in such a manner as to form a cocoon (29). The method is enhanced by utilizing a last support apparatus (34) to rotate the last (32) during the wrapping step. The continuous fiber material (28) is ordinarily in the form of a swath (54) which is either preformed or is created from a ropelike tow (282) by a fiber separator (284). When the cocoon (29) is complete it is removed from the last (32) and inserted into a preformed enclosing shell (23) including an outer shell (24), an inner shell (26) and a closure such as a zipper (20). The preferred method of removal involves heating and edge stabilizing along the fiber edges (62) to form a heat bead (64) which aids in attaching the cocoon (29) to the shell (23). The sleeping bags (10) and other articles produced by the method are characterized by having excellent loft to weight ratios, an absence of unnecessary stitching, an absence of resins or artificial binders for the insulation and a soft and springy feel. Manufacturing advantages include improved economy, minimization of hazardous materials and particles, ease of sewing and flexibility to allow nonuniform arrangements of insulation.

15 Claims, 3 Drawing Sheets

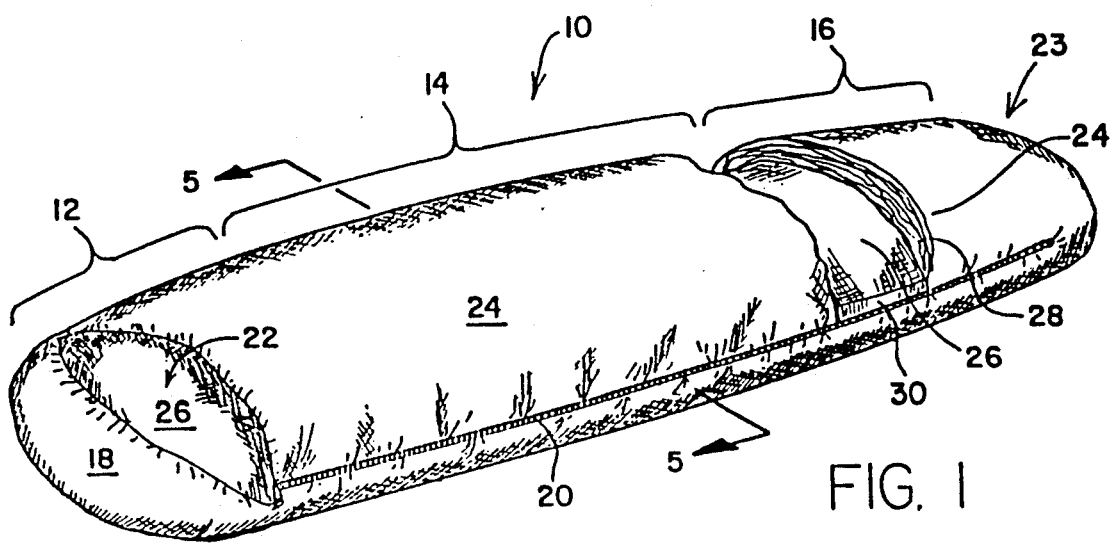
FIG. 1
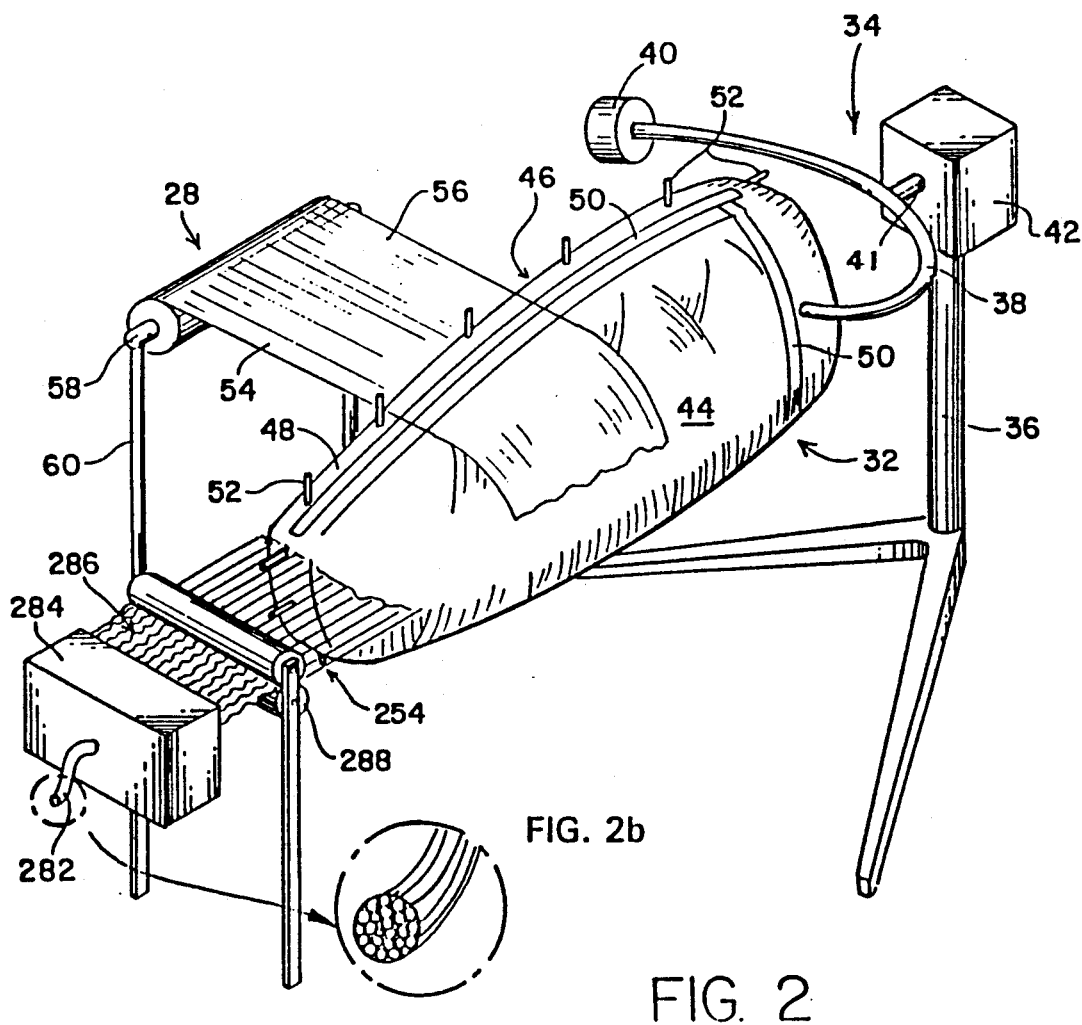
FIG. 2b
FIG. 2

A. CREATE LAST
  1. ANALYZE VOLUMETRIC SHAPE
  2. FORM LAST TO SHAPE
  3. INSTALL LAST ON SUPPORT
  4. INSERT POSITIONING PINS

B. WRAP INSULATION ON LAST
  1. SELECT WRAPPING PATTERN
  2. CREATE SWATH
     (a.) PRE-EXISTING SHEET ROLL; OR
     (b.) SPREAD TOW
  3. ATTACH SWATH END TO LAST
  4. WRAP SWATH ABOUT LAST
     (a.) TURNING LAST; OR
     (b.) STATIONARY LAST

C. CUT AND EDGE STABILIZATION
  1. DETERMINE SEPARATION LINES
  2. PLACE BINDER SHEETS
  3. COMPRESS ALONG SEPARATION LINES
  4. FIBER MELT CUTTING

D. INSERT COCOON IN SHELL
  1. PREMANUFACTURE SHELL
  2. INVERT SHELL
  3. PEEL COCOON OFF LAST
  4. ATTACH COCOON TO STRIPS
  5. RE-INVERT SHELL AND COCOON
  6. SECURE INVERSION APERTURE
  (7.) APPLY PIERCING RIVETS

FIG. 6

METHOD OF SLEEPING BAG CONSTRUCTION AND ARTICLES MADE THEREBY

TECHNICAL FIELD

The present invention relates generally to insulated articles and the manufacture thereof and more specifically to sleeping bag construction techniques and structures.

BACKGROUND ART

Those familiar with backpacking, camping, mountain climbing and other overnight outdoor activities will readily agree that among the most important items of equipment is a good sleeping bag. Nearly any type of weather can be tolerated if the person has access to a warm and comfortable sleeping bag in which to rest. The shelter and insulation provided by a good sleeping bag is absolutely essential to a successful excursion.

Various factors affect the viability of a good sleeping bag under various conditions. For many applications, such as backpacking, it is important that the sleeping bag be relatively light to carry. On the other hand, the bag must provide enough loft or thickness of insulation to provide warmth under varying degrees of cold conditions. The material and insulation of the bag should also be capable of "breathing" such that moisture does not build up in the interior or the insulation and destroy the insulating qualities. It is also very desirable that the bag be very compressible such that it may be transported in a relatively small space. Additionally, a factor known as "softness" or "hand" of the insulation is important for the purposes of allowing the bag to drape more closely around the body so as to minimize air flow, thereby maximizing insulation. Visual appearance factors are also important from a marketability standpoint. These and other factors are often at odds with one another and all of them need to be taken into account with an eye to economics of materials and manufacturing costs in determining the appropriate method of construction of a quality sleeping bag.

Various inventors have made attempts to create high quality sleeping bags having the best possible combination of all of the important factors. The traditionally accepted bags which were considered the highest quality are those manufactured utilizing waterfowl down as an insulating material enclosed in breathable fabric shell. However, in recent years, synthetic insulating materials have become more and more useful, primarily due to the cost limitations and improvements in the synthetics. Various methods of forming the shells and the interior portions of the shells have also been attempted.

Some United States Patents which indicate attempts to create effective sleeping bag constructions are exemplified by U.S. Pat. No. 3,367,560, issued to D. L. Johnson in Feb. 6, 1968, U.S. Pat. No. 3,787,906, issued to H. Hunt on Jan. 29, 1974 and U.S. Pat. No. 3,959,834, issued to H. Hunt on Jun. 1, 1976. The Johnson patent deals with a method of encapsulating down insulating material into tubes or envelopes and utilizing these individual envelopes as separate insulating compartments within the overall shell. The two Hunt patents are concerned with the overall formation of the sleeping bag itself and also with the method in which the insulating material is contained between the layers of the shell.

As is clear from the disclosures of the above named references, one of the factors that is considered most important in sleeping bag construction is the ratio of loft of insulating material versus the weight of the bag. The loft is the thickness of the insulating material between the inner and outer layers of the enclosing shell when the sleeping bag is in utilization mode. The loft, which is measured in units of length such as centimeters or inches, is a combination of the thickness of the actual insulating material and the expanded thickness thereof caused by the entrapment of air within the insulating layer. Waterfowl down, such as goose down, is noted for its particularly high loft to weight ratio in that the material is such that it entraps a great deal of air for the weight of the down. To date, no synthetic material has been as effective in achieving a high loft to weight ratio as natural down. However, natural down is a very expensive item and can also have other disadvantages.

Another factor of importance is that the insulation material must retain its general integrity of shape within the shell in order to avoid problems caused by shifting of the insulating material to result in locations within the shell where the thickness becomes very thin. This can result in cold spots and/or lumps in situations where the material bunches into thicker concentrations. The bunching of the insulating material can be a substantial disadvantage and cause discomfort to the user. The avoidance of bunching can be accomplished, as in the Johnson and Hunt references (see especially FIG. 2 of the Hunt '834 patent and FIG. 4 of the Hunt '906 patent) by restricting the insulating material to tubes or compartments within the shell itself. While this is generally effective it can have the disadvantage that the inner and outer layers of the shell are actually connected by the fabric enclosing the compartments and creating a "thin" spot in the wall that can allow conductive heat loss and may also result in other potential disadvantages. This method also increases the complexity of construction as well as adding to the weight and the cost. Methods such as the overlapping tube construction techniques found in many high quality sleeping bags are somewhat effective but do not solve all of the problems inherent in this method.

Methods for use of synthetic fibers, as opposed to down, in sleeping bags are highly desirable for a variety of reasons. While down still claims the highest loft-to-weight ratio and the best compressibility, it has the accompanying disadvantages of high cost, substantial loss of insulating value when wet and the other problems. Therefore, synthetic sleeping bags are popular and advantageous in that they retain warmth even when wet; are easily maintained; are non-allergenic; are less expensive to manufacture; are more easily contained in shells (no need to tightly weave shell material to prevent "escape"); are made from materials in more reliable and consistent-cost supply; are subject to continuing improvement as synthetic manufacturing techniques advance, while down is fixed in quality by nature.

As good as synthetic bags have become they still have not equaled down bags in the area considered all-critical in the industry loft/weight radio. Synthetic bags also have their own sets of problems, including the difficulty in optimizing loft, softness, durability and slipperiness in a construction adapted to minimize fiber shifting, in a manner such as the tube constructions restrict feather shifting in down bags. While it is possible to make air-transportable fiber (ATF) out of synthetic, so far no truly successful imitation of down has been found. All have bunched, matted or clumped when washed. So far all successful synthetics have relied on one of two general methods: (1) continuous crimped filament, such as Polarguard, which is made into a batt (a sheet 45" wide by hundreds of yards long) by laying up layers of filaments zig zagging and overlapping on a conveyor, applying resin to bind the fibers in place, and running the conveyor through an oven to set the resins; (2) chopped fiber (1"-2" long), which is made into a batt by essentially air-layering the crimped fibers onto a conveyor, spraying them with resin, and again put in an oven. The batt (now quite bulky) can then be shipped to a sleeping bag manufacturer, who cuts the batt into pieces he can use to construct a bag in one of several ways. Basically these manufacturing methods either some form of quilting or laminating layers of the batt to the shell or "shingling" (the cutting of "shingles" which are sewn to both the inside and outside shells in such a way to overlap and fill the space within.) While it is generally accepted that shingle construction bags tend to have higher loft, great debate still rages as to which fiber, continuous, or chopped, makes the best batt.

Continuous filament is undoubtedly stronger and less likely to migrate than chopped filament, and by itself is as lofty, soft and compressible as chopped filament. However, it is extremely difficult to handle unless substantial amounts or resins are applied to bond the fibers such that they do not get tangled in the manufacturing process. This resin has several disadvantages. It increases the cost significantly, increases the weight, reduces the loft, decreases the softness and compressibility and also makes the previously fire retardant fiber quite flammable.

Chopped fibers are more popular, primarily because they are easier to deal with in manufacturing processes, resulting in lower costs.

The chopped fibers are less susceptible to snagging and tangling and require lower amounts of resin to achieve the bonding within the batts. Chopped fibers can thus provide cheaper, lighter and softer installation than continuous filament ("CF") materials. Resin usage for chopped fiber batts can be minimized, if not eliminated by the use of scrim, a webbed material attached to the batt to retain the fibers. However, scrims add to weight and detract from loft and compressibility. Chopped fiber insulation can also result in "scratchy" bags in that fiber ends may occasionally protrude through the shell. Additionally, doubt remains as to the loft and durability advantages of the chopped fiber bags over the long term.

Due to all of the above discussed problems and many more which also affect the determination on how to best construct a sleeping bag, a great variety of different methods have been utilized and none has been completely successful. Accordingly, room for improvement continues to exist in this field.

SUMMARY OF THE INVENTION

Accordingly, it is an object of the present invention to provide a method of construction for a sleeping bag which utilizes continuous filament material to obtain a very high loft to weight ratio, and maintains the superior durability characteristics of continuous filament.

Another object of the present invention is to provide a sleeping bag which has a minimum of quilt-through lines between the inner and outer layers of the shell such that conductive heat transfer between the layers is minimized and greater constant loft is maintained.

It is a further object of the present invention to provide a method of construction wherein continuous filament materials may be utilized without the need for a binder such as a resin.

Another object of the present invention is to provide a method of construction which utilizes continuous filament material while allowing the use of silicones and other lubricants to provide the slickest, softest fiber possible.

A further object is to provide a method of construction which uses the fiber in its cleanest, purest ("unopened") state before the expensive process of making a batt has made the material expensive, bulky to ship and bulky to store.

It is yet another object of the present invention to provide a method of constructing a sleeping bag which combines the features of high loft to weight ratio, softness, good compressibility, insulation material strength, and economic manufacture.

It is a still further object of the present invention to provide a method of manufacture of sleeping bags which may be accomplished in a limited space and with a minimum of labor.

It is still another object of the present invention to provide a method of constructing sleeping bags wherein separate compartments within the shell are eliminated while retaining excellent resistance to shifting and bunching of insulating material.

It is a further object to eliminate the cutting table step in cutting batts of insulation, thus resulting in great time, space and labor savings, as well as preventing substantial material wastage in the cutting steps.

It is an another object to allow as much of the shell fabric sewing, and zipper setting, etc., is possible, before the insulation is applied, as the increased weight and bulk of the insulation makes these tasks substantially more difficult.

It is a still further object of the present invention to provide a method of manufacturing sleeping bags which minimizes the health hazards to manufacturing personnel.

Briefly, the preferred embodiment of the present invention is a method of manufacturing sleeping bags and insulated articles of a similar nature, being in the form of an enclosing shell with the shell having a inner layer and a outer layer surrounding an interior layer of insulation therebetween. The method is specifically adapted for manufacture of sleeping bags utilizing a continuous filament ("CF") variety of insulating material.

The first step in the manufacturing process is to create a three dimensional form, or "last" element, in the general shape of the sleeping bag interior. The continuous filament material is then wrapped about the last element in such a manner as to form an all-enclosing cocoon thereabout. In the preferred embodiment this is accomplished wrapping a sheet-like array of continuous fibers about the last in a spiral (helical) pattern up and down the last until an all-enclosing cocoon having the appropriate thickness at each portion thereof is achieved. The preferred method of wrapping utilizes a method of spinning the last while feeding the sheet of CF material over the last to form the cocoon. The process results in CF fibers being arrayed perpendicularly to other CF fibers over the entire last, thus enhancing fiber binding.

Once the shaping of the cocoon has been completed the cocoon is opened by essentially simultaneously compressing, cutting and edge stabilizing the CF material along preselected lines. In the preferred embodiment, where the CF material is a polyester, this heating and edge stabilizing is accomplished by utilizing a heated knife or a sonic cutter which melts the fiber and binds adjacent fibers together with a heat bead along the line of the cut. Precompression along the cutline causes the heat bead to seal all of the fiber ends together. For a typical sleeping bag construction the separation line will be along one side of the cocoon with an opening then being provided at the top for the head aperture. The edge stabilizing provided by the melting effect causes the cocoon to retain complete structural integrity and also substantially compresses the insulating material in the areas of the separation line. This facilitates sewing and attaching of the fabric shell to the cocoon at these locations.

The cut and opened cocoon can then be removed from the last element and inserted into a pre-formed shell. The shell may be pre-formed with the inner and outer layers already attached to one another at all locations except along the separation lines where the shell material is to be attached to the cocoon, these typically being the zipper line along the side or front of the bag and the head aperture. The shells are preconstructed to include an attachment strip extending inward from each seam where the shell is to be affixed to the insulation so that the insulation need only be sewn to the attachment strip and not directly into the seam. The preconstruction can proceed to the point where only a single unclosed seam remains so that an inside-out inversion can be accomplished about that seam during the insertion step. The shells may be prefabricated in quantity and maintained so that they may be turned inside-out for ready application to the cocoon to form the complete shell. The shell material is then attached to the cocoon along the attachment strips and separation lines. In some cases, piercing rivets or similar tie-through materials may be utilized to connect the inner and outer shells at various points around the periphery of the cocoon to prevent the shell layers from bunching. At this point other attachments may be provided and the construction of the bag is complete once the bag is turned right side out and the turning hole is closed.

An advantage of the present invention is that it provides a method of constructing sleeping bags using continuous filament fiber insulation material without the necessity of binders or scrims.

Another advantage of the present invention is that the CF material utilized in constructing the bag may be transported in a tow form, thus avoiding the inherent disadvantages of "shipping air", and saving substantial costs over the comparative price of an equal weight of batted fiber.

A further advantage of the present invention is that the use of CF insulating material eliminates the presence of fiber ends within the insulation compartment and also during the manufacturing process, thus increasing the comfort factor while reducing health hazards in manufacturing.

Still another advantage of the present invention is that the method of manufacture may be carried out in a relatively small area and with substantially less labor than the prior art manufacturing methods for synthetic fiber insulating material sleeping bags.

A still further advantage of the present invention is that a very large portion of the process is susceptible to automation, thus minimizing labor expense.

Still another advantage of the present invention is that the edge stabilization along the separation lines permits successful sewing to a CF insulation material and maintains the structural integrity of the cocoon after completion of the manufacture.

A further advantage of the present invention is that the fabric shells can be nearly completely constructed prior to creating the cocoon in such a manner that they may be premanufactured at a different site and thus result in substantial savings.

Yet another advantage of the present invention is that the resulting sleeping bags have a soft and springy feel, each is compressible into a relatively small volume, and each has an excellent loft-to-weight ratio.

A further advantage of the present invention is that the resulting sleeping bags avoid the problems of hard spots and bunching of material as well as eliminating sewing seams except adjacent to the zipper and hood areas.

Another advantage of the present invention is that the wrapping technique about the last element may be modified in such a manner to provide extra insulation in areas where it is required, such as in the foot area or the top, without requiring modification of the shell construction.

Still another advantage of the present invention is that it is not necessary to use binders or resins which increase fire hazards in the insulation material.

A still further advantage of the present invention is that it eliminates the need for quilt lines across the shell, thus permitting decorative art, logos, and the like to be placed on the shell for visual aesthetic purposes.

These and other objects and advantages of the present invention will become clear to those skilled in the art upon review of the following specification, the accompanying drawings and the appended claims.

BRIEF DESCRIPTION OF THE DRAWINGS

FIG. 1 is a partially cut away perspective view of a sleeping bag manufactured according to the method of the present invention;

FIG. 2 is a perspective view of a preferred last element and last turning apparatus being utilized during the wrapping step of the method;

FIG. 6 is a flow chart diagram illustrating the method of manufacture of the preferred embodiment of the present invention.

BEST MODE OF CARRYING OUT THE INVENTION

Figure 3:
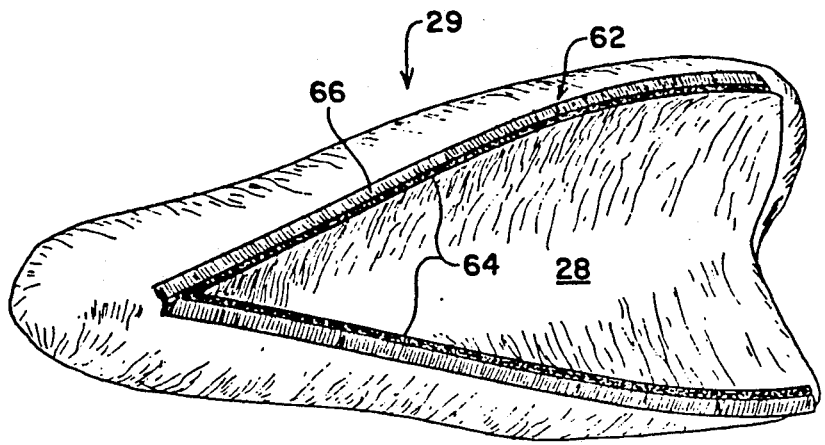
FIG. 3 is an illustration of a cocoon manufactured according to the present invention, shown after removal from the last element.

The present invention centers around a method of manufacture of insulated hollow items such as sleeping bags and to the items manufactured thereby. The invention is particularly adapted for utilization with continuous filament ("CF") synthetic materials such as extruded polyester. The invention is adapted for use in a relatively small space with relatively small storage requirements and with minimum labor involved in the sewing procedures.

The preferred embodiment of the present invention is a method of manufacture of sleeping bags of the nature of the bag illustrated in a partially cut-away perspective view of FIG. 1. The sleeping bag is referred to by the general reference character 10 and is shown as being a conventionally appearing sleeping bag from the outside. The particular contours and shaping of the bag are not critical to the invention and the method of manufacture of the present invention may be adapted to create sleeping bags of a variety of shapes and dimensions as well as other insulated items.

The sleeping bag 10 can be seen to have a head portion 12, a torso portion 14 and a foot portion 16. The area of the head portion 12 is generally referred to as the hood 18. A zipper 20 or similar enclosing fixture is provided along one side of the bag 10 to allow access by the user. The bag 10 is provided with a head aperture 22 in the vicinity of the hood 18 to that the user's face may be exposed. Frequently, the head aperture 22 is provided with an enclosing mechanism such as a drawstring to draw the hood 18 closely around the user's head in extreme cold conditions.

In the illustration of FIG. 1 a portion of the sleeping bag 10 has been cut away to show the construction thereof. In this illustration it may be seen that the bag 10 is provided with an enclosing shell 23 (shown more particularly in FIG. (3) which is in the form of an outer shell 24, which is exposed to the environment, and an inner shell 26, which is exposed to the body of the user. A layer of insulation 28 (CF material) is inserted intermediate the outer shell 24 and the inner shell 26 in the completed bag 10. The present invention is primarily concerned with the insulation 28, the method with which it is formed and the manner in which it is inserted and secured within the enclosing shell 23 between the outer shell 24 and the inner shell 26. Especially, the method of forming an integral cocoon 29 of insulation is important to the construction.

The sleeping bag 10 is also provided with an insulated zipper shield 30 (also known as a "draft tube") which extends along the zipper 20 in the interior of the bag 10. The zipper shield 30 is provided to minimize air flow through the vicinity of the zipper 20 and thus helps to prevent cold spots on the side of the user nearest the zipper 20. The draft tube 30 is shown in a more detail in FIGS. 3 and 4.

FIG. 2 illustrates, in a generally perspective manner, the apparatus and materials utilized by the method of the present invention to create the cocoon 29 of the CF insulation 28 which forms the interior of the sleeping bag 10 of FIG. 1. The primary component utilized in the method of manufacture is a preformed "last" element 32 which is designed to have generally the same volumetric shape as the interior of the sleeping bag 10 which is the desired object of manufacture but is typically larger in order to allow for shrinkage. The last element 32 illustrated in FIG. 2 is shaped generally to create a resulting sleeping bag 10 of the same general shape as that illustrated in FIG. 1.

The last element 32, also known as a "form", is supported in as free of a manner as possible by a last support apparatus 34. One simplified last support apparatus 34 which may be utilized in the preferred embodiment is shown in FIG. 2. The support apparatus 34 includes a stand 36, an attachment bar 38, which is firmly attached to the last element 32 and to the stand 36 so as to support the last element 32 from the single point of attachment to the attachment bar 38 only. This sort of single point support is particularly desirable in that it allows nearly complete access to the last element 32 for the purposes of wrapping insulating material 28 thereabout. Typically, as shown in FIG. 2, the attachment bar 38 is secured to the last element 32 at a location which corresponds to a point within the head aperture 22 on the resulting bag 10. This assures that any deviation in the wrapping pattern caused by having to wrap about the attachment bar 38 is not reflected in the final bag 10 since it falls in the area of the insulating cocoon 29 which is to be discarded.

Since the attachment bar 38 creates a lever arm extending from the stand 36 to the last element 32, it is desirable to provide a counterweight 40 on the opposite end of the attachment bar 38 from the last element 32. This facilitates rotating the attachment bar about a pivot 41 with respect to the stand 36 such that the last element 32 rotates therewith.

The rotational force to rotate the attachment bar 38, and consequently the last element 32, about the pivot 41 may be provided by a variety of methods. A hand crank is one possibility. Another possibility, which is illustrated in FIG. 2, is that of a variable speed electric motor 42 which may be controlled by the user by such means as a foot pedal control or some other mechanism. It is also envisioned that the motor rotation could be robotically controlled once a selected pattern of wrapping has been established. Of course, in the strictest sense, it is not necessary to rotate the last 32 at all, rather it may be maintained in a stationary position while the CF fiber material is wrapped about it. However, it has been found to be more efficient to use a rotating last 32 in order to achieve rapid and even distribution.

The last element 32 itself is formed in the general volumetric shape of the interior of the bag 10 (ordinarily proportionally larger to accommodate shrinkage) and includes a top surface 44, a bottom surface 46 and a side surface 48 which extends completely around the last element 32 intermediate the top surface 44 and the bottom surface 46. The designations of the top surface 44 and the bottom surface 46, in order to place attachment bar within the head opening 22, are as shown in the illustration of FIG. 2 where the top surface 44 is selected to be the surface wherein the attachment bar 38 is secured to the last element 32.

The top surface 44 and a portion of the side surface 48 are each provided of the surface forming a cutting panel 50. The locations of the cutting panels 50 correspond to the locations where the eventual cocoon 29 is to be breached in order to provide the head aperture 22 and the zipper 20. Since it is desirable to form the last element 32 out of a lightweight structural material such as styrofoam or a similar material which has low heat resistance, and since it is also desirable to use a heat cutting and edge sealing technique on the cocoon 29, it is necessary that the cutting panels 50 protect the structural material of the last element 32 from degradation upon repeated use. Metal strips or plates are appropriate for forming the cutting panels 50.

In one preferred embodiment illustrated in FIG. 2 the last element 32 is also provided with a plurality of positioning pins 52 provided in the vicinity of the side panel surface 48 in order to allow the user to gauge the location of various elements on the last element 32, such as the cutting panels 50, after the cocoon 29 is in place. The positioning pins 52 further serve the purpose of holding a swath 54 of the CF material 28 in position during the wrapping process until the formation of the cocoon 29 is well established. The CF material 28 utilized to form the cocoon 29 is shown in FIG. 2 as being in the form of a sheet 56 applied from a roll 58 mounted on a roll support 60. The CF material 28 is in the form of a plurality of continuous fibers of polyester or other suitable material. Each of these fibers has effectively infinite length. The fibers are also arrayed essentially parallel to one another. However, the actual fibers themselves are not smooth and straight cylinders unlike, for example, a monofilament fishing line. Rather, the individual fibers include a great variety of kinks and twists which cause them to become intertwined with and loosely bonded to adjacent fibers, particularly when the adjacent fibers are not arrayed directly parallel to one another. Therefore, once the wrapping process has proceeded to a degree the swaths 54 of various passes over the last 32 will begin to overlap in a manner such that the individual fibers themselves are not all from the same sheet 56. Thus the non-parallel fibers will have intertwining kinks and will be bound to one another by frictional forces in such a way that they will effectively hold their positions once the cocoon wrapping stage is fairly underway. Consequently, positioning pins 52 are no longer necessary for holding purposed during later stages. The cocoon 29 itself maintains excellent structural integrity even after being removed from the last element 32 especially after cutting and edge sealing as described below.

An alternate form of delivering the insulation 28 to the cocoon 29, and an augmented method of applying two swaths 54 of insulation 28 simultaneously, is illustrated in phantom in FIG. 2. The reference numerals applied to this set of elements are from the "200" series, with elements common to previously described elements having the same designations, preceded by the digit "2".

In the phantom illustration of FIG. 2 it may be seen that a second swath 254 of insulation 28 is shown as being applied to the last 32 from the end. This augmented application approach results in a greater degree of right angled fibers and consequently increased inter-fiber binding and improved loft over the single swath method. The application of the second swath 254 may be varied and timed to result in any desired thickness and arrangement of insulation.

The source of the insulation 28 of the second swath 254 is shown as being a ropelike component of CF fiber known as a tow 282. The tow 282 represents the most efficient form of the material for shipment and includes all of the fibers in a tight elongated rope. The CF fibers are of effectively infinite length and the tow 282 may be considered to be an endless rope for most purposes.

In order to make the hard, compressed fibers of the tow 282 usable for insulation purposes, it is necessary to feed the tow 282 through a fiber separation device 284, generally known as a tow opening machine. The separation device 28 mechanically separates the fibers and spreads them out along an axis perpendicular to the tow 282 to create an array of expanded tow 286. The expanded tow 286 is then passed between rollers 288 to form the swath 254, which may then be utilized as a source of insulation 28. It is expected that this method of providing swaths 54 and 254 of insulation 28 will be preferred for various reasons discussed hereinafter.

The illustration of FIG. 3 shows the cocoon 29 after it has been removed from the last element 32. The removal is accomplished by cutting the all-enclosing cocoon 29 along the lines of the cutting panels 50 in order to provide the openings for the zipper 20 and the head aperture 22.

In the illustration of FIG. 3 it may be seen that the CF fiber insulation material 28 forming a cocoon 29 has exposed fiber edges 62 where it has been separated by the cutting technique. In the preferred embodiment, the separation of the cocoon 29 to provide the openings is accomplished by a heat knife or a sonic cutter. In each of these cases the cutting technique acts to melt adjacent fibers together to form a heat bead 64 at the fiber edges 62 (see, also Fits 4 and 5). The heat bead 64 effectively eliminates loose ends of the fiber material 28 by bonding the ends together into a relatively smooth surfaced strip extending the length of the cut. Since compression pressure is also applied during the cutting and edge sealing operation the fibers from all layers of the cocoon 29 are bonded together at the fiber edge 62 into the heat bead 64. Therefore, the net result is that no exposed fiber ends are created by the operation.

At the separation edge 62 the cocoon 29 is shown to have a binder sheet 66 attached thereto. The preferred binder sheet is approximately 15 cm. (6 in.) to 25 cm (10 in.) wide, is acquired in rolls and is applied over all areas of the cocoon 29 to be cut. The binder sheet 66 aids in stabilizing the edge 62 and in sewing other elements thereto. The binder sheet 66 particularly protects the sewing machine elements from becoming entangled in the slippery filaments of the insulation 28.

Returning to FIG. 2, it may be seen that the embodiment shown relates to the CF fiber material 28 being applied to the last element 32 in the form of the sheet 56. This method is effective when the CF material 28 is utilized in the form of rolls 58. However, this is not necessarily the preferred method.

One method of obtaining the CF material 28 is in the form of a tightly bunched rope or "tow" 282. The tow 282 is in the form of a large plurality of individual filaments of the CF material 28 formed into a continuous cylindrical form and held in position by the frictional interaction of the individual fibers, as discussed above. The tow 282 is a preferable method of obtaining the CF material 28 since the shipment thereof is considerably less bulky than the roll form 58 since the filaments in the tow 282 are closely compressed. Thus, the space, storage and shipment problems associated with "shipping and storing air" are eliminated.

When tow is used as the source of the CF material 28, it is necessary to run the tow 282 through the fiber separation device 284 (such as the commercial "Polar Guard" Opening Machine) which separates the fibers from the rope form of the tow 282 and arrays them in an expanded tow 286 arrangement which may then be compressed and formed by the rollers 288 into the swath 254, which bears a resemblance to the sheets 56 shown in FIG. 2. It is envisioned that the use of swath 254 obtained from the tow 282 form of the CF material 28 will be the preferred embodiment utilized for the wrapping step illustrated in FIG. 2.

Figure 4:
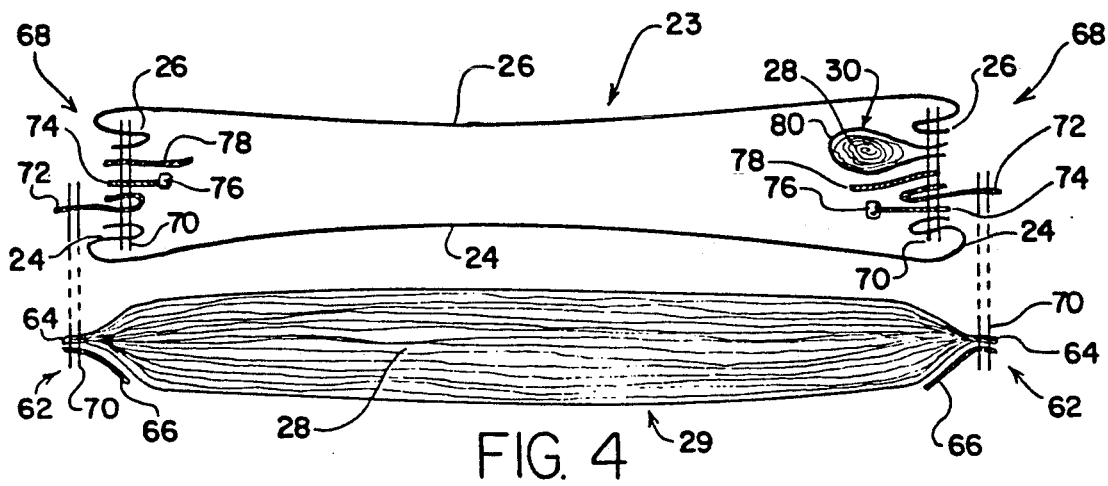
FIG. 4 is an illustration of an enclosing shell manufactured according to the present invention, shown prior to attachment to the insulation cocoon.
Figure 5:
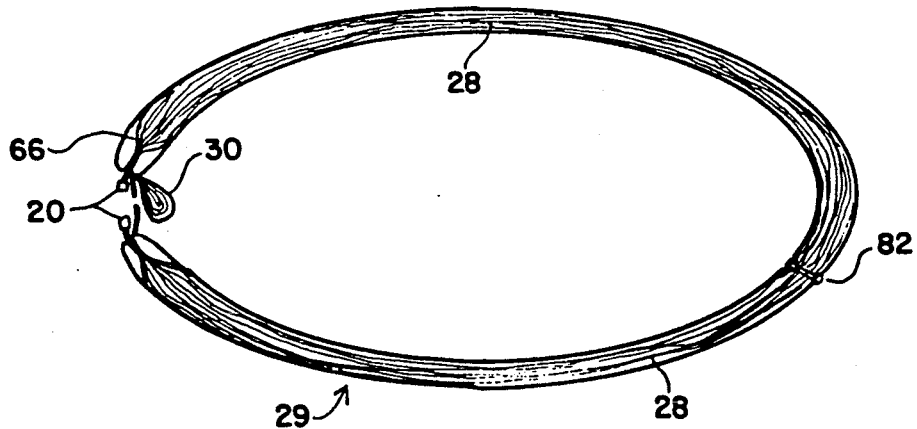
FIG. 5 is a cross section, taken along line 5—5 of FIG. 1, showing the completed sleeping bag.

The illustrations of FIG. 4 and 5 illustrate the manner in which the cocoon 29 is inserted within the enclosing shell 23. FIG. 4 illustrates a cross section of the elements prior to insertion while FIG. 5 shows a completed sleeping bag 10 in a cross section taken along line 5—5 of FIG. 1. These illustrations are particularly useful in understanding the seam construction and the manner in which the shell 23 and the cocoon 29 interact in the final construction.

In the view of FIG. 4, the areas defining seam zones 68 are expanded to show the manner in which the enclosing shell 23 is secured together and attached to the other elements of the bag 10. The seam zones 68 shown are those wherein the zipper 20 is attached to the shell 23, with one of the seam zones 68 also including the zipper shield 30. In FIG. 4 the shell 23 is shown as inverted to an inside-out orientation to facilitate attachment to the cocoon 29.

Each of the seam zones 68 includes a number of components secured in place with a binding thread 70. One separate element which is secured to the seam zone 68 is an attachment strip 72. The attachment strip 72 provides the means for attaching the cocoon 29 to the shell 23. The attachment strip 72 is a bond of sturdy fabric which will extend into the interior of the bag 10 when the construction is complete (see FIG. 5). The cocoon 29 is sewn to the attachment strip 72 by a further amount of binding thread 70, passing through the attachment strip 72 and through the fiber edge 62 and binder sheet 66 at a point just interior of the heat bead 64.

The zipper 20 is attached to the seam zone 68 by a zipper stem 74 which is sewn into the seam 68. The zipper stem 74 culminates, at appropriate intervals, in a series of zipper teeth 76. The conventional zipper 20 is adapted to form a releasable closing mechanism for the bag, allowing user access. The seam zone 68 further includes a zipper flap 78, in the form of a flap of relatively stiff fabric arrayed adjacent to the zipper teeth 76 to minimize entanglement between the zipper teeth 76 and the material of the shell 23.

Along one of the seams 68, the draft tube (zipper shield) 30 is secured to the seam zone 68. The draft tube 30 includes a draft tube shell 80, formed of the same material as the inner shell 26, having both edges sewn into the seam 68. The interior of the draft tube 30 is filled with insulation materials 28 and the ends are sewn shut to prevent escape of the insulation 28.

Each seam zone 68 further includes the appropriate edges of the outer shell 24 and the inner shell 26. The binding thread 70 secures these edges so as to form the outer shell 24 and the inner shell 26. The binding thread 70 secures these edges so as to form the outer shell 24 and the inner shell 26 into the enclosing shell 23.

While FIG. 4 shows the shell 23 in inverted mode, to facilitate attachment to the cocoon 29, FIG. 5 shows the same vicinity after the attachment and reinversion. In this illustration it may be seen that when the shell 23 is turned right-side-out, the cocoon 29 is caused to be enclosed and is situated in between the outer shell 24 and the inner shell 26. The zipper 20, the draft tube 30 and the zipper flap 78, shown to the interior in FIG. 4, are now facing outward for use. The attachment strip 72, with the cocoon 29 attached thereto, is now interior. The seam zones 68 are now oriented such that all fabric edges, which are shown to extend outward in FIG. 4, are now turned inward to eliminate raveling. The draft tube 30 is oriented to the interior of the sleeping bag 10 to stop air drafts and to also prevent the user's body from contacting the harder and colder material of the zipper teeth 78.

A final, and optional element which is illustrated in FIG. 5, is a piercing rivet 82. The piercing rivet 82 extends between the outer shell 24 and the inner shell 26 at one or more locations remote from the seam zones 68. The function of the piercing rivets 82 is to prevent internal shifting of the insulation material 28 and to keep the inner shell 26 oriented consistently with respect to the outer shell 24. The number and location of piercing rivets 82 is selected to minimize any heat transfer or hard spot problems.

Turning now to the illustration of FIG. 6, the method of manufacturing sleeping bags and other insulated volume enclosing elements, according to the present, invention is illustrated in a flow chart manner. This schematic representation is utilized to illustrate the various steps which are performed in the process of the present invention as adapted specifically to the manufacture of a sleeping bag such as the bag 10 shown in FIG. 1.

The first major step (Step A) involved is that of creating and readying the "last" or "form" which is utilized as the shape about which the insulating material is to be wrapped. The shape of the last 32 will be specific to a given style and size of sleeping bag and it is expected that a variety of last elements will be created in order to accommodate manufacturing sleeping bags 10 of differing styles and sizes.

The first substep (substep A-1) of the last formation step involves analyzing the volumetric shape of the sleeping bag 10 which is the desired object of construction. Once the volumetric shape has been analyzed a second substep (A-2) is undertaken. Substep A-2 involves forming the last 32 into the shape equivalent to the desired interior specification of the bag 10, taking into account an allowance for shrinkage. The last element 32 then conforms to the volumetric shape analyzed in A-1. Sub step A-3 is then undertaken by installing the last element 32 upon the last support and rotation apparatus 34 selected. In the preferred embodiment a further step, substep A-4, is then undertaken in which the positioning pins 52 are inserted at various locations on the last element 32 in order to aid the manufacturing personnel in positioning the swath 54 of insulation material 28 during the wrapping step.

Once major step A has been completed the second major step is that of B, wrapping. In the wrapping of step B the insulation material 28 is placed about the last element 32 in order to form the cocoon 29. The illustration of FIG. 4, discussed above, shows the wrapping step B in progress.

The first substep B-1 involved in the wrapping step B involves the selection of an appropriate wrapping pattern for the particular type of cocoon 29 to be created. The presently preferred wrapping pattern involves a helical arrangement of overlapping layers of the CF material 28 to achieve a substantially uniform thickness. However, for special applications such as cold weather bags it may be desirable to utilize a pattern in which a greater thickness of insulation is provided at the foot 16 and the head 12 than in torso 14. Other specialized arrangements of the CF material 28 may also be accomplished by careful selection of the wrapping pattern.

The second substep, illustrated as B-2, involves creating the appropriate swath 54 of the CF material 28 for use in wrapping. There are two alternatives to this creation, as discussed above. The illustration of FIG. 2 shows a pre-existing sheet 56 obtained in a roll form directly from the manufacturer. The sheet 56 is an adequate swath 54 for wrapping. The alternate mechanism, as also described above, involves working from raw tow 282 and using a spreading machine 284 to create the swath 254. In either case the width of the swath 54 is selected with an eye toward the particular wrapping pattern, and of course, the wrapping pattern is selected knowing the width of swath 54 to be utilized. In an augmented version of this substep, a second source of the swath 54 is utilized to create a more uniformly perpendicular fiber array, as is shown in phantom in FIG. 2.

In substep B-3 the swath 54 is attached to the last element 32 in some manner. In the illustration of FIG. 2, this is accomplished by holding the swath 54, near its exterior end, in position on the last element 32 by the use of the positioning pins 52. However, the swath 54 may be secured to the last 32 by other methods, such as a degradable adhesive, or even tape. It is even possible to physically hold the end of the swath 54 in position until a certain amount of turns have been accomplished and the natural binding of adjacent layers of the insulation material 28 holds the swath 54 in place without external force. The main purpose is to simply secure the end in some manner such that the wrapping pattern can continue without slippage.

The wrapping step B then continues in substep B-4 the actual wrapping of the swath 54 of the insulating material 28 about the last element 32. This may be accomplished in the preferred embodiment by turning the last 32 by way of the rotational motor 42 while simultaneously directing the swath 54 in the preselected pattern. Alternatively, it is possible to utilize a stationary last element 32 while directing the swath 54 about it in the desired pattern. Any mechanism by which the cocoon forming wrapping pattern may be accomplished is adequate for this substep.

Once the wrapping of step B has been completed, the cocoon 29 is in the form of an all enclosing shell about the last element 32. It is then necessary, in step C, to cut and edge stabilize the CF material 28 in order to remove the cocoon 29 from the last 32 and also to provide the openings into the sleeping bag 10. This step also creates the fiber separation edge area 62 and the heat bead 64 which allow the cocoon 29 to be fastened to the enclosing shell 23.

The first substep in this area is substep C-1, that of determining the appropriate separation lines. As discussed above with respect to FIG. 2, the last element 32 is provided with a series of cutting panels 50 which provide the locations for cutting. Determining the points of the exterior of the enclosing cocoon 29 may either be accomplished by viewing the known positioning pins 52 or by some other method.

Once the cutting lines have been determined it is then desirable to place the binder sheet 66 along the cutting lines in substep C-2. As discussed above, the binder sheet 66 is a meltable polyester material resembling mosquito netting and is utilized to help stabilize the edge as well as to provide support for stitching in the areas of the seam 68. The binder sheet 66 is placed to extend along the line of the seam 68 and to extend a short distance to either side.

In substep C-3 the material of the cocoon 29 is compressed along the separation lines directly ahead of cutting. Typically this is combined with substep C-4, the actual cutting step by having the cutting tool provided with an advanced plate which pushes ahead of the cutting element so as to compress the cocoon material 28 in such a manner that the fibers are in close juxtaposition along the separation line. It is desirable that the zone of compression extends beyond the separation line to hold the fibers together long enough to form a stable heat bean 64 with complete fiber end containment. The actual separation is accomplished in step C-4 in the preferred embodiment by heat melt knife having sufficient temperature to melt the CF material 28 and the binder sheet 66 such that these separate and form a heat bead 64 on each side of the separation line.

Once the material of the cocoon 29 has been cut and edge stabilized it is ready to be removed from the last element 32 and inserted in the preformed shell 23 in Step D. This is accomplished in order to allow stitching of the cocoon material into the enclosing shell 23, which is best accomplished separate from the last element 32.

The first substep, D-1, which may be greatly separated in time from the remainder, is to premanufacture the enclosing shell 23 that is designed to fit the particular cocoon 29 involved. Typically, the shell will be premanufactured with all of the seams already completed with the exception of an attachment portal on a seam zone 68 at any desired location which is left open to permit inversion about the cocoon 29. The shell 23 is inverted to inside-out position (FIG. 4) in step D-2 with the seams 68 which are adjacent to the zipper 20 and the head aperture 22, requiring actual attachment to the cocoon 29 having the attachment strip 72 extending outward (FIG. 4).

The cocoon 29 is peeled off the last element 32 in substep D-3 and attached to the inverted shell 23 in substep D-4. The reason that the shell 23 is inverted is to allow the cocoon to be easily sewn to the attachment strips 74 while all edges are accessible to the sewing machine operator.

Once all of the fiber edges 62 of the cocoon 29 have been secured to the corresponding attachment strips 72, the bag 10 is ready for reinversion, in substep D-5. In this substep the shell 23 and cocoon 29 are inverted through the attachment aperture and stuffed through until a right-side-out orientation is achieved. The basic construction is then completed in Step D-6 by sewing up or otherwise closing the attachment aperture.

An alternate final seep D-7 may then be accomplished by providing at least some piercing rivets 82 or other quilt through points in order to prevent the inner shell 26 from becoming too widely separated from the outer shell 24. The tie-throughs or rivets 82 also help to maintain the smooth and complete contact of the inner shell 26 with the cocoon 29. This is desirable in order to prevent bunching of the inner shell material 26, which can lead to fold lines and discomfort to the user.

At this point, the manufacturing process is completed and the finished sleeping bag 10 is ready. The only remaining possibilities are alternate procedures such as attachment of peripheral elements such as decorative touches. The construction process has been accomplished in fewer steps and with less complexity and hazard to the workers than in prior art methods.

In the preferred embodiment, the CF fiber 28 utilized is polyester available from the Celanese Corporation. The last element 32 is generally constructed of a light weight structural material such as styrofoam with a hard metal surface in the areas of the cutting panels 50. The materials utilized for the enclosing shell 23 and the other components of the sleeping bag 10 are conventional and similar to those used in other bags of the same nature.

The primary available alternate embodiments of the invention would be to modify the nature of the wrapping pattern such that it creates a device other than a sleeping bag, such as a insulated drawstring cooler or the like. It is also possible to use alternate CF fiber materials or stitching patterns. However, none of these modifications alter the basic characteristic of the inventive process or the products made thereby.

Those skilled in art will readily observe that numerous other modifications and alterations of the method, apparatus and end products may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The method of the present invention will have immediate industrial applicability in the commercial manufacture of sleeping bags. The most unusual step will be the actual construction of the last element 32 which may be accomplished by any machine shop or other three dimensional element formation operation. The remaining steps may be accomplished by minimally skilled personnel.

It is therefore expected that the method will obtain immediate industrial use in the sleeping bag field. It is also considered likely that the wrapping techniques and continuous fiber utilization techniques of the present invention will have widespread utility in fields other than sleeping bags. Although only a few alternate products, such as insulated drawstring devices, are envisioned at the present time, it is contemplated that a wide variety of additional uses will be discovered by those in the art.

In light of the above, and especially in light of the many advantages set forth above in the Summary of the Invention section, it is expected that the method of sleeping bag manufacture and the products made thereby, according to the present invention, will enjoy widespread commercial utility and industrial applicability.

I claim:

1. A method of manufacture of an insulated item having a shell at least partially surrounding a central volume, said shell being hollow and having opposing flexible inner and outer layers and including a fibrous insulating material in the interior volume formed between said inner and outer shell layers, in steps comprising:
   a. forming a last member approximately in the shape of said central volume;
   b. arraying a plurality of continuous fibers which form said fibrous insulating material into a swath and wrapping said swath about said last member so as to fully enclose said last member to a desired depth at each area of the surface of said last member so as to form an enclosing cocoon thereabout;
   c. separating and edge stabilizing said continuous fibers along preselected separation lines on said cocoon;
   d. removing said cocoon from said last member and inserting into a preformed shell member; and
   e. attaching said preformed shell member to said cocoon along said separation lines and attaching at least some corresponding opposing points on said inner and outer shell layers to one another.

2. The method of claim 1 wherein
said continuous fibers are originally gathered in the form of a generally ropelike tow and are separated by an opening device into said swath, said swath being relatively wide along a first axis perpendicular to the longitudinal axis of said fibers and relatively thin along a second axis perpendicular to both said longitudinal axis and said first axis.

3. The method of claim 1 wherein
the separating and edge stabilizing of step c. is accomplished by a heated element which melts said fibers to separate each individual fiber longitudinally while heat welding adjacent fibers together to form a continuous edge bead.

4. The method of claim 1 wherein
said cocoon is compressed along said separation lines as a precursor to step c.

5. The method of claim 3 wherein step c. is accomplished with a heated knife blade.

6. The method of claim 3 wherein step c. is accomplished with a sonic cutting element.

7. The method of claim 1 wherein said swath is in the form of sheet material obtained from a roll.

8. The method of claim 1 wherein step b. is accomplished by spinning said last element about a longitudinal axis thereof while feeding said swath from a location lateral to said last so as to wrap in a preselected pattern about said last.

9. The method of claim 8 wherein step b. is augmented by feeding a longitudinal swath component, similar in form to said swath, selectively to said last from a position generally along a longitudinal axis of said last concurrently with feeding said swath from said lateral location.

10. The method of claim 1 wherein
said preformed shell is placed into an inside-out configuration prior to step d. and said inserting step is accomplished by uninverting said shell over said cocoon while urging said inner layer into said central volume.

11. The method of claim 1 wherein the insulated item is a sleeping bag.

12. The method of claim 3 wherein as a precursor to step c., a binder material is placed along said separation lines, said binder material being suitable for melting by said heated element.

13. The method of claim 1 wherein
subsequent to step c., an attachment strip is secured to said cocoon along said separation lines, said attachment strip being adapted to form a portion by which said cocoon is attached to said preformed shell member in step e.

14. The method of claim 1 wherein positioning pins are inserted at desired locations, on said last member prior to said wrapping of step b., said positioning pins aiding in the placement and support of said swath during said wrapping.

15. The method of claim 1 wherein
cutting panels are provided on said last member along said separation lines so as to protect said last member from damage during step c.

* * * * *